W. GOLJAN.
FRONT AXLE DRIVE FOR DIRIGIBLE VEHICLES.
APPLICATION FILED DEC. 4, 1917.
1,311,343.       Patented July 29, 1919.
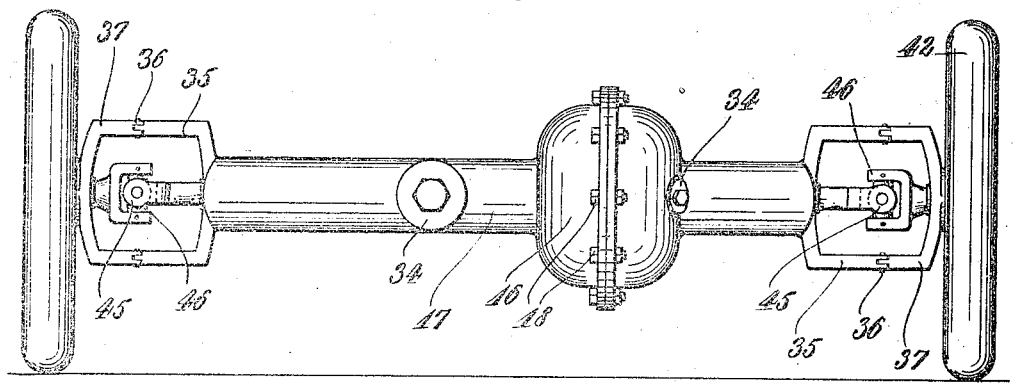
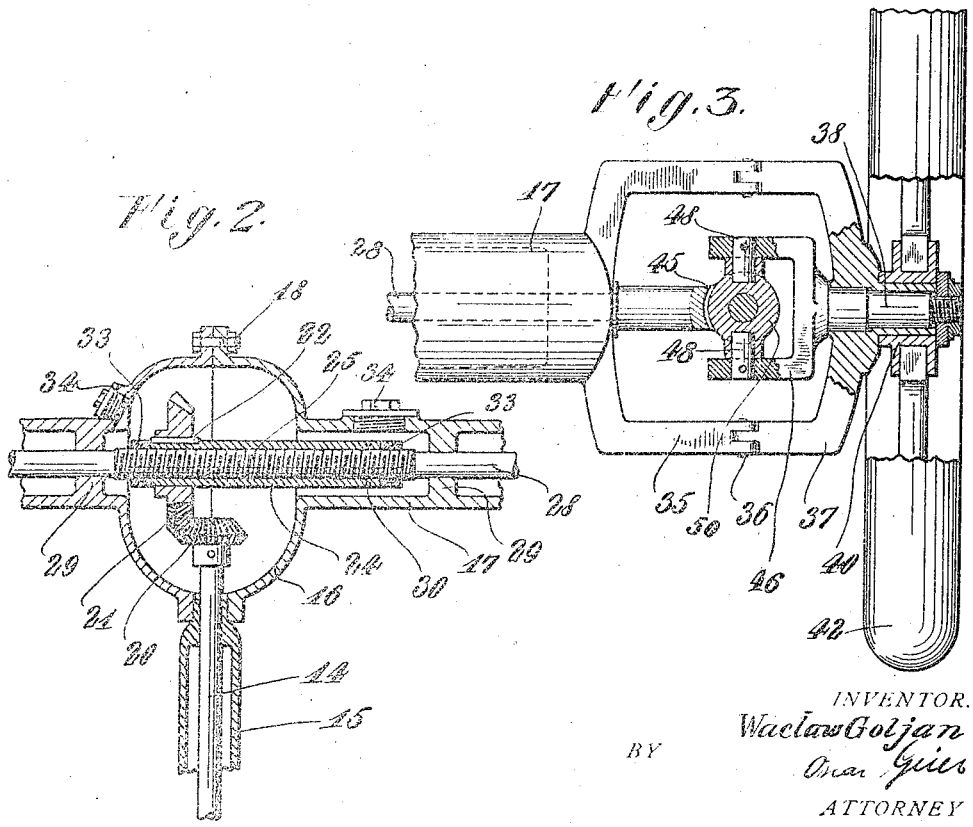
INVENTOR.
Waclaw Goljan
BY
ATTORNEY

UNITED STATES PATENT OFFICE.

WACLAW GOLJAN, OF COSMOPOLIS, WASHINGTON.

FRONT-AXLE DRIVE FOR DIRIGIBLE VEHICLES.

1,311,343.     Specification of Letters Patent.     Patented July 29, 1919.

Application filed December 4, 1917. Serial No. 205,315.

*To all whom it may concern:*

Be it known that I, WACLAW GOLJAN, a citizen of Russia, resident of Cosmopolis, county of Chehalis, and State of Washington, have invented certain new and useful Improvements in Front-Axle Drives for Dirigible Vehicles, of which the following is a specification.

This invention relates to improvements in driving means for wheeled vehicles, particularly to types in which the front wheels are dirigible.

The principal object of the invention is to provide means whereby the front wheels are permitted to turn within such limits as are customary, power being supplied to the same through a hollow axle from any convenient source carried by the vehicle.

Another object is to provide means whereby the gears used in conveying power to the axle may be kept in adjustment so as to be unaffected by wear.

These and other like objects are attained by the novel construction and combination of parts hereinafter described and shown in the accompanying drawings, forming a material part of this specification, and in which:—

Figure 1 is an enlarged front elevation of the power shaft casing with the device constructed according to the present invention.

Fig. 2 is an enlarged fragmental view taken through the power transmitting means and housing thereof, and Fig. 3 is a fragmental front elevational and sectional view showing the connection to the driving wheels.

Power is supplied to the driving shaft 14 from any convenient source, the same being supported and housed in a tubular casing 15, which is engaged with the transverse axle casing 17 by means of the enlarged sectional gear casing 16, the casing being secured by bolts 18 in an obvious manner.

Within the casing 16, and secured to the end of the shaft 14, is a gear 20, the mating gear 21, being held by the key 22, to a sleeve 24, fitted to a threaded portion 25, of the front axle 28, which is supported in bearings 29 formed in the casing 17.

Openings 30 are formed in the sleeve 24, by means of which it can be turned and provided at the ends of the sleeve are locks 33, by means of which the sleeve 24 may be adjusted longitudinally on the screw threaded portion of the axle and locked thereon in any desired adjustment.

Formed with the ends of the casing 17 are forks 35, engaged by hinged joints 36, with oppositely disposed forks 37, in which are bearings for the spindles 38 upon which the hub 40, of the front wheels 42 are rigidly secured, the spindles 38 being in direct alinement with the ends of the shaft 28.

The ends of the shaft 28 are formed into forks 45, in which are pivotally engaged the opposite elements of the forks 46, of the spindles 38, by means of pins 48, pivotally engaged in four armed yokes 50, the pivotal joints 36 being coincident with the axis of the yokes 50 permit the wheels to move to a considerable angle without in any way interfering with the transmission of power by the shaft 28 to the spindles 38. It will also be apparent that in order to effect adjustment between the gears 20 and 21, openings are provided in the cases covered by caps 34, the same being of sufficient size to admit the entrance of wrenches or other implements by means of which the nuts 33 may be turned, in adjusting the gears relative to each other.

From the foregoing it will be seen that an effective device has been disclosed whereby the front wheels of the vehicle may be steered and at the same time caused to have a propulsive effect. It will be further evident that the gearing from which power is imparted to the front axle may be maintained in close proper relation by the novel form of adjusting means disclosed.

Having thus described my invention, what I claim as new and desire to secure by Letters Patent, is:—

In a front drive for vehicles, the combination with a casing, and an axle rotatably mounted therein, of a perforated sleeve, screw threaded on said axle, a gear keyed to one end of said sleeve, lock nuts at the ends of said sleeve for allowing an adjustment of the same longitudinally on the screw-threaded part of the axle, said sleeve permitting a turning on said axle through the engagement of its perforations by a tool, a shaft transversely disposed to said axle, a gear secured to the end of said shaft located within said casing, and meshing with said first named gear, and caps closing openings in said casing and permitting the introduction of said nut turning tools, substantially as described.

In testimony whereof I have affixed my signature.

WACLAW GOLJAN.